United States Patent
Cressy et al.

(10) Patent No.: US 6,662,467 B2
(45) Date of Patent: *Dec. 16, 2003

(54) DRYING ASSEMBLY AND METHOD OF DRYING FOR A FLOODED ENCLOSED ELEVATED SPACE

(76) Inventors: Charles S. Cressy, 309 Lincoln Dr., Ocean, NJ (US) 07712; Michael Tufariello, 1508 Dorsett Dock Rd., Point Pleasant, NJ (US) 08742

( * ) Notice: Subject to any disclaimer, the term of this patent is extended or adjusted under 35 U.S.C. 154(b) by 0 days.

This patent is subject to a terminal disclaimer.

(21) Appl. No.: 10/206,433

(22) Filed: Jul. 29, 2002

(65) Prior Publication Data

US 2003/0029054 A1 Feb. 13, 2003

Related U.S. Application Data

(63) Continuation-in-part of application No. 09/799,925, filed on Mar. 6, 2001, now Pat. No. 6,457,258.

(51) Int. Cl.[7] .................................................. F26B 21/08
(52) U.S. Cl. ............................ 34/443; 34/218; 34/234; 34/235

(58) Field of Search .......................... 34/443, 84, 218, 34/220, 223, 234, 235; 454/233, 236, 49

(56) References Cited

U.S. PATENT DOCUMENTS 6,457,258 B1 * 10/2002 Cressy et al. ................. 34/443

* cited by examiner

Primary Examiner—Jiping Lu
(74) Attorney, Agent, or Firm—Clifford G. Frayne

(57) ABSTRACT

A portable hand truck mounted drying assembly for the drying of an elevated enclosed space which has been subjected to flooding, the drying assembly having an inlet path for the introduction of ambient air into the enclosed space, the ambient air being preheated in a heat exchanger by moisture laden air removed from the enclosed space, the preheated ambient air being subjected to further heating before introduction into the enclosed space, the portable hand truck mounted unit being positioned within the enclosed space and having a plurality of conduits in communication with the enclosed space for the introduction of dry heated air and the removal of moisture laden air.

9 Claims, 2 Drawing Sheets

US 6,662,467 B2

DRYING ASSEMBLY AND METHOD OF DRYING FOR A FLOODED ENCLOSED ELEVATED SPACE

RELATED APPLICATIONS

This application is a continuation in part of application Ser. No. 09/799,925, filed Mar. 6, 2001 now U.S. Pat. No. 6,457,258.

BACKGROUND OF THE INVENTION

1. Field of the Invention

The present invention relates to drying assemblies, and in particular, to a portable drying assembly for drying out elevated businesses and residences that have been subjected to flooding, such as high rise apartments or office buildings.

2. Description of the Prior Art

Residences and businesses are oftentimes subjected to flooding, sometimes of a natural occurrence and sometimes the result of a broken water pipe. The water so introduced into the residence or business permeates everything which it contacts up to the level of the flood water and additionally generates a relatively high humidity within the residence or business which can affect walls and ceilings significantly higher than the flood line.

The only recourse in such a situation was to strip off and discard the affected floor coverings, remove the damaged furniture, and dismantle the damaged wall coverings and ceilings. Then portable fans would be positioned in the affected area to circulate air in an effort to dry out the water soaked floor boards, wall studs and ceiling joists. These fan units were relatively small and capable of being transported by hand and positioned at various locations within the residence or business. While these devices did affect the drying out of the flooded area, they did not do so efficiently or efficaciously. In fact, they took significant time to effectuate the drying process and in doing so allowed for mold to form on the interior framing of the residence or business. If this mold was not noticed and not removed, it would be covered up when the interior walls were re-sheet rocked and then such mold would then present a health hazard once the residence or business was reinhabited. It is imperative that the drying process be initiated and completed as soon as possible to avoid the development of mold.

Therefore there was a need for a drying unit which could dry out a damaged residence or business more efficaciously and more quickly. Applicant's novel drying unit in application Ser. No. 09/799,925 addresses and solves this problem with respect to floors relatively proximate to ground level. There is still the necessity to remove water soaked floor coverings, furniture and sheetrock, however, Applicant's unit supplies extremely dry, hot air in sufficient volumetric quantity to dry a comparable residence or business in approximately 10% of the time, thereby preventing the growth of mold and further permitting the inhabitant of the residence or business earlier access to the premises to effect repairs and redecorating.

This application is directed to an apparatus based upon the principles of application Ser. No. 09/799,925, but is specifically designed for use in high rise apartment's, office buildings or the like where the apparatus of application Ser. No. 09/799,925 cannot reach.

OBJECTS OF THE INVENTION

An object of the present invention is to provide for a novel drying assembly to dry out a residence or business, particularly an elevated residence or business, subjected to flooding wherein the drying assembly introduces heated, ambient, low humidity air into the unit and removes moisture laden air from the flooded unit.

Another object of the present invention is to provide a novel drying assembly for drying a residence or business, particularly an elevated residence or business, subjected to flooding in which the moisture laden air is utilized to preheat the ambient air in a heat exchanger prior to its introduction to the residence or business.

Another object of the present invention is to provide a novel drying assembly for the drying of a residence or business, particularly an elevated residence or business, subjected to flooding in which preheated low humidity ambient air is introduced into the residence or business in sufficient volume to prevent the growth of mold.

A still further object of the present invention is to provide for a novel drying assembly which is portable and self-contained on its own hand truck and can be transported to a flooded elevated residence or business and be positioned within the flooded area with intake and exhaust conduits in communication with the ambient atmosphere.

SUMMARY OF THE INVENTION

A portable, hand truck mounted drying assembly for the drying of an elevated residence or business which has been subjected to flooding, the drying assembly being positioned within the elevated residence or business, said drying assembly having an inlet path for the introduction of ambient air into the residence or business, the drying assembly further having an outlet path for the evacuation of moisture laden air from the residence or business, each path having associated therewith a variable speed blower to insure the desired volumetric capacity regardless of the lengths of the paths, the inlet path and the outlet path both passing through a common preheat exchanger wherein the moisture laden exhaust air preheats the incoming ambient air, the preheated ambient air being further subjected to heating in a heater, the heater being in communication with a power source, the inlet conduit extending from said heater extending within said residence or business, and the exhaust conduit extending from the drying assembly back to the ambient atmosphere, both being flexible conduits of a sufficient diameter to achieve the desired volumetric flow rate.

BRIEF DESCRIPTION OF THE DRAWINGS

These and other objects of the present invention will become evident particularly when taken in light of the following illustrations wherein.

DETAILED DESCRIPTION OF THE DRAWINGS

Figure 1:
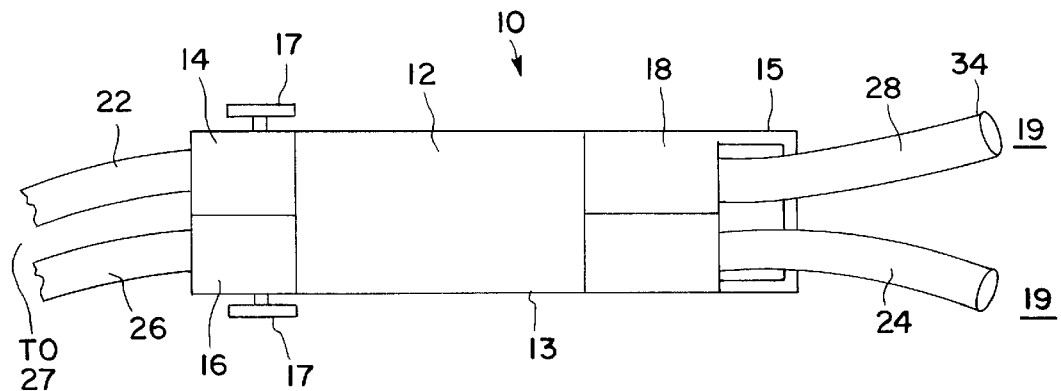
FIG. 1 is a schematic diagram of the drying assembly of the present invention.

FIG. 1 is a schematic drawing of the drying assembly 10. The drying assembly 10 is comprised of several elements, the first being a plate heat exchanger 12 which preheats the ambient air as more fully described hereafter. There is also included a first variable speed blower 14 in the inlet path and a second variable speed blower 16 in the outlet path. The inlet path also includes a heater 18. Heater 18 and blowers 14 and 16 are in communication with a power source 20.

Figure 2:
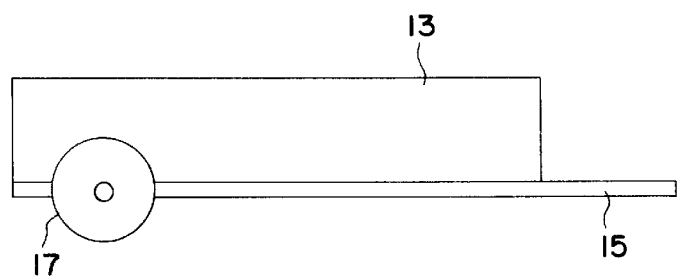
FIG. 2 is a side view of the drying assembly mounted on a portable hand truck.
Figure 3:
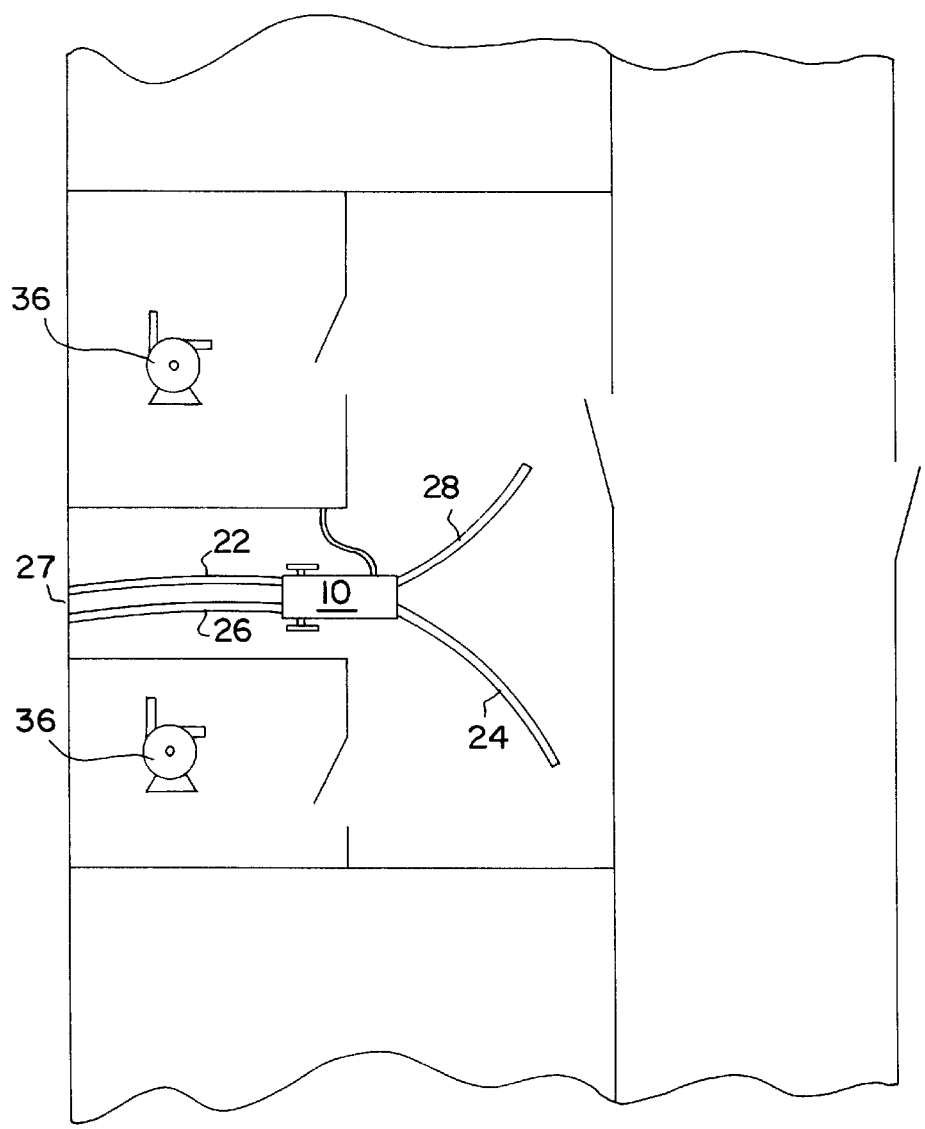
FIG. 3 is a top view of a typical high rise floor plan with the drying assembly of the present invention.

In the preferred embodiment as will be illustrated in FIG. 2, these elements would be mounted on an enclosed housing 13 mounted on a hand truck like frame 15 with wheels 17 providing portability of the assembly and its ability to be transported and placed within the elevated residence or business which has been subjected to flooding. At steady state operation with heater 18 at the desired temperature and both variable speed motors 14 and 16 operational, ambient air would be drawn in via conduit 22 through an inlet port framed in a window 27 and introduced into flat plate heat exchanger 12 where it would pass through discrete passageways. Moisture laden air drawn from the elevated residence or business 19, via conduit 24 by means of variable speed blower 16 would be introduced into a flat plate heat exchange 12 in counterflow to the ambient air through separate discrete passageways. The moisture laden air from the elevated residence or business would serve to preheat the ambient air in flat plate exchange 12 prior to the moisture laden air being evacuated to the atmosphere via conduit 26 through an outlet port framed in a window 27. The preheated ambient air is then communicated via variable speed blower 14 to heater 18 where its temperature is increased to approximately 115 degrees Fahrenheit at which time it is then introduced into the residence or business 19 having been subjected to flooding by means of conduit 28 at the approximate rate of 400 cubic feet per minute. The power source 20 for the heater 18 and blowers 14 and 16 are preferably an electrical outlet proximate to the area being dried.

One of the advantages of the design of this assembly is that the ambient air drawn into the assembly can be ambient air of any meteorological condition since its subjection to a preheater and heater results in an air flow introduced into the elevated residence or business which is of extremely low humidity and at a temperature of approximately 115 degrees. The volumetric amount of flow results in extremely fast drying and the development of a high humidity evacuation flow stream.

In the present operation, the heating unit 18 is rated at 68,000 btu. The variable speed blowers are rated at 400 cubic feet per minute. The heat exchanger is also rated for 400 cubic feet per minute and has 700 square feet of heat exchange surface with the plates being spaced 0.2 inches apart.

As an example of steady state operation, the unit was operating on a residence when the ambient temperature was 30° F. The moisture laden air being returned from the building was 85° F. and the temperature of the inlet air after passing through the heat exchanger was raised from 30° F. to 79° F. It was then heated with the heater 18 to a temperature of 115° F. and introduced into the residence with a relative humidity of less than 5%.

The ends 32 and 34 of conduits 24 and 28 may be positioned within the residence or business in accordance with where the most serious flooding took place. Additionally, fans 36 may be positioned within the residence or business to help circulate the heated incoming air.

Conduits 22, 24, 26, and 28 are preferably a reinforced, flexible conduit and a diameter of 8 inches has been found suitable to achieve the desired flow rate. Conduits 24 and 28 can be snaked about the room layouts of the residence or business and can from time to time be repositioned. The same holds true for the circulating fans 36.

The design of the assembly and its portability allows it to be positioned within the flooded elevated residence or building and to operate at steady state unattended with the exception of relocating the conduits 24 and 28 and fans 36. The assembly can easily be transported in hand truck fashion by one individual.

While the present invention has been described with respect to the exemplary embodiments thereof, it will be recognized by those of ordinary skill in the art that many modifications and changes can be made without departing from the spirit and scope of the invention. Therefore it is manifestly intended that the invention be limited only be the claims and the equivalence thereof.

I claim:

1. A portable assembly for drying an enclosed space at an elevated height above ground level comprising:

an energy exchange unit, said energy exchange unit having,
an ambient air inlet for the introduction of ambient air;
an exhaust air inlet for the introduction of moisture laden exhaust air from an enclosed space, said moisture laden exhaust air having thermal energy;
a heat exchanger accepting said ambient air from said ambient air inlet and said moisture laden exhaust air from said exhaust air inlet, said heat exchanger having a plurality of first discrete channels for the passage of said ambient air and a plurality of second discrete channels in alternating arrangement with said first discrete channels for the passage of said moisture laden exhaust air in counterflow to said ambient air, thereby preheating said ambient air, said heat exchanger having an exhaust air outlet for venting said moisture laden air to the atmosphere and an ambient air outlet;

a heating means for further heating said ambient air;
conduit means for directing said heated ambient air to said enclosed space;
a first propulsion means for transporting said ambient air from said ambient air inlet to said enclosed space;
conduit means directing said exhaust air to said atmosphere; and
a second propulsion means for transporting said exhaust air from said enclosed space to said atmosphere.

2. The portable assembly for drying an enclosed-space in accordance with claim 1 wherein said energy exchange unit, said heating means and said propulsion means are mounted on a hand truck.

3. The portable assembly for drying an enclosed space in accordance with claim 1 wherein said heat exchanger is a flat plate heat exchanger.

4. The portable assembly for drying an enclosed space in accordance with claim 3 wherein said flat plate heat exchanger has the capacity of 400 cubic feet per minute.

5. The portable assembly for drying an enclosed space in accordance with claim 1 wherein said first propulsion means and said second propulsion means comprise variable speed blowers.

6. The portable assembly for drying an enclosed space in accordance with claim 1 wherein said conduit means for directed said heated ambient air to said enclosed space comprises flexible reinforced tubing.

7. The portable assembly for drying an enclosed space in accordance with claim 6 wherein said flexible reinforced tubing is of a diameter of 8 inches.

8. The portable assembly for drying an enclosed space in accordance with claim 1 wherein said heating means has a rated capacity sufficient to heat said ambient air to a temperature of 115° F.

9. A method of drying an elevated enclosed space which has been subjected to flooding, said method comprising:

mounting an energy exchange unit on a hand truck, said energy exchange unit having an ambient air inlet and an exhaust air inlet, a heat exchanger having a plurality of first discrete channels and a plurality of second discrete channels in alternating arrangement with said first discrete channels and exhaust air outlet and an ambient air outlet;

mounting a heating means on said hand truck in communication with said heat exchanger;

mounting a first propulsion means and a second propulsion means on said hand truck in communication with said heat exchanger;

positioning said hand truck within said enclosed space;

providing conduit means from said heating means to said enclosed space;

providing conduit means from said enclosed space to said energy exchange unit;

activating said first propulsion means and said second propulsion means;

activating said heating means;

introducing said ambient air into said heat exchanger through said first discrete channels;

introducing said exhaust air into said heat exchanger through said second discrete channels;

preheating said ambient air with said exhaust air in said heat exchanger;

venting said exhaust air to said atmosphere;

introducing said preheated ambient air to said heating means;

heating said preheated ambient air and introducing same into said enclosed space.

* * * * *